(12) United States Patent
Jobdevairakkam et al.

(10) Patent No.: US 8,404,784 B2
(45) Date of Patent: Mar. 26, 2013

(54) MANUFACTURING PROCESS OF MAKING POLYMERIC AMINE SALTS

(75) Inventors: Christopher N. Jobdevairakkam, Plainsboro, NJ (US); Hero Velladurai, Plainsboro, NJ (US)

(73) Assignee: Navinta LLC, Ewing, NJ (US)

( * ) Notice: Subject to any disclaimer, the term of this patent is extended or adjusted under 35 U.S.C. 154(b) by 241 days.

(21) Appl. No.: 12/629,133

(22) Filed: Dec. 2, 2009

(65) Prior Publication Data

US 2010/0137542 A1 Jun. 3, 2010

Related U.S. Application Data

(60) Provisional application No. 61/119,606, filed on Dec. 3, 2008.

(51) Int. Cl.
*C08F 26/02* (2006.01)
*C08F 126/02* (2006.01)

(52) U.S. Cl. ............... 525/328.2; 525/355; 525/359.3; 424/78.01; 424/78.1; 424/78.12; 424/78.17; 424/78.18; 424/78.26; 424/78.27; 424/78.31; 424/78.35

(58) Field of Classification Search ............... 525/328.2, 525/355, 359.3; 424/78.01, 78.1, 78.12, 424/78.17, 78.18, 78.26, 78.27, 78.31, 78.35
See application file for complete search history.

(56) References Cited

U.S. PATENT DOCUMENTS

| | | |
|---|---|---|
| 4,605,701 A | 8/1986 | Harada et al. |
| 5,399,591 A | 3/1995 | Smith et al. |
| 5,496,545 A | 3/1996 | Holmes-Farley et al. |
| 5,607,669 A * | 3/1997 | Mandeville et al. ....... 424/78.12 |
| 5,667,775 A | 9/1997 | Holmes-Farley et al. |
| 5,679,717 A | 10/1997 | Mandeville, III et al. |
| 5,693,675 A | 12/1997 | Mandeville, III et al. |
| 5,917,007 A | 6/1999 | Mandeville, III et al. |
| 5,919,832 A | 7/1999 | Mandeville, III et al. |
| 6,066,678 A | 5/2000 | Mandeville, III et al. |
| 6,083,495 A | 7/2000 | Holmes-Farley et al. |
| 6,180,754 B1 * | 1/2001 | Stutts et al. ................... 528/422 |
| 6,423,754 B1 | 7/2002 | Holmes-Farley et al. |
| 6,433,026 B2 | 8/2002 | Mandeville, III et al. |
| 6,509,013 B1 | 1/2003 | Holmes-Farley et al. |
| 6,525,113 B2 | 2/2003 | Klix et al. |
| 6,600,011 B2 | 7/2003 | McDonnell et al. |
| 6,710,162 B2 | 3/2004 | Rea |
| 6,733,780 B1 | 5/2004 | Tyler et al. |
| 6,806,350 B2 * | 10/2004 | Stanek et al. ................ 528/491 |
| 6,858,203 B2 | 2/2005 | Holmes-Farley et al. |
| 6,874,254 B1 | 4/2005 | Silvera et al. |
| 7,014,846 B2 | 3/2006 | Holmes-Farley et al. |
| 7,101,960 B2 | 9/2006 | Mandeville, III et al. |
| 7,541,024 B2 | 6/2009 | Petersen et al. |
| 2002/0159968 A1 * | 10/2002 | Petersen et al. ............ 424/78.37 |
| 2004/0106745 A1 * | 6/2004 | Nakashima et al. .......... 525/418 |
| 2004/0120922 A1 | 6/2004 | Burke |
| 2006/0251614 A1 * | 11/2006 | Bhagat et al. .............. 424/78.27 |
| 2007/0224283 A1 | 9/2007 | Chang et al. |

FOREIGN PATENT DOCUMENTS

| | | |
|---|---|---|
| IN | 200601893 | 7/2008 |
| WO | 2009010531 A1 | 1/2009 |

OTHER PUBLICATIONS

International Search Report and Written Opinion of the International Searching Authority; PCT/US2009/66528; Jan. 23, 2009; 8 pages.

* cited by examiner

*Primary Examiner* — Robert C Boyle
(74) *Attorney, Agent, or Firm* — St. Onge Steward Johnston & Reens LLC

(57) ABSTRACT

A novel process of manufacturing sevelamer carbonate from a polyallylamine carbonate or bicarbonate chloride salt. Process for manufacture of carbonate and/or bicarbonate salts of water insoluble polymers containing amino groups that are useful as anion binders in the gastrointestinal (GI) system. The process arranges the polyallylamine chain in a solution in such a way that the cross-linking reaction with epichlorohydrin can be controlled at a desired reaction rate.

34 Claims, No Drawings

MANUFACTURING PROCESS OF MAKING POLYMERIC AMINE SALTS

CROSS-REFERENCE TO RELATED APPLICATIONS

The present application claims the benefit under 35 U.S.C. §119 (e) of the Provisional Patent Application Ser. No. 61/119,606 filed Dec. 3, 2008.

FIELD OF THE INVENTION

This invention relates to processes for making polymeric amine carbonate and/or bicarbonate salts.

BACKGROUND OF THE INVENTION

Polyallylamine is a homopolymer of allylamine monomer obtained by polymerization of allylamine hydrochloride using a radical initiator such as 2,2'-azobis(2-methylpropionaimidine) dihydrochloride. Polyallylamine is used to form polyallylamine hydrochloride salts which are produced by polymerization of allylamine hydrochloride in presence of a radical initiator. Polyallylamine hydrochloride is a homopolymer of molecular weight ranging from 2000 to 100,000 Daltons. Polyallylamine and polyallylamine hydrochloride are highly soluble in water, which upon cross-linking with suitable N-alkylating reagents becomes water insoluble, and forms a water swellable polymer.

Cross-linked polyallylamine salts are found to be efficient anion exchange polymers that are insoluble in water. Because of this property, cross-linked polyallylamine salts evolved as good phosphate binders and/or bile acid binders without going into a solution form and thus polyallylamine salts are useful as a local acting drug administered to treat hyperphosphatamia and hyperlipidemia. The protonated polymeric amine groups of cross-linked polyallylamine interact with phosphate ions in the intestine. By binding with phosphate ions in the dietary tract, the cross-linked polyallylamine reduces absorption of phosphate and lowers phosphate levels in the serum. Sevelamer hydrochloride (approved by FDA and sold in the United States under the brand name Renagel®) is a cross-linked polyallylamine hydrochloride having a $CH_2$-CHOH—$CH_2$ group between two amino groups, wherein about 40% of the amine groups are protonated and associated with a chloride anion. Sevelamer hydrochloride contains about 18% chloride by weight, and when administered orally, the chloride anion is exchanged for phosphate anion in the gastro-intestinal (GI) tract thus reducing the phosphate level in the blood stream. The process of making polyallylamine hydrochloride cross-linked with epichlorohydrin (sevelamer hydrochloride) is disclosed in U.S. Pat. No. 4,605,701 (Harada et al.), U.S. Pat. No. 5,496,545 (Holmes-Farley et al.), U.S. Pat. No. 5,667,775 (Holmes-Farley et al.), U.S. Pat. No. 6,083,495 (Holmes-Farley et al.), U.S. Pat. No. 6,423,754 (Holmes-Farley et al.), U.S. Pat. No. 6,509,013 (Holmes-Farley et al.), U.S. Pat. No. 6,710,162 (Rea), U.S. Pat. No. 6,733,780 (Tyler et al.), U.S. Pat. No. 7,014,846 (Holmes-Farley et al.), U.S. Pat. No. 6,600,011 (McDonnell et al.), and U.S. Pat. No. 6,525,113 (Klix et al.) which are herein incorporated by reference. Additionally, in U.S. patent application Ser. No. 10/125,684 (Petersen et al.) now U.S. Pat. No. 7,541,024 (Petersen et al.), polyallylamine with reduced salt was used to prepare a cross-linked polyallylamine hydrochloride containing about 5 to 12% chloride, which is significantly lower compared to the sevelamer hydrochloride currently on the market as Renagel®. These processes are good for making a hydrochloride salt of the cross-linked polymer in the chloride form.

Colesevelam hydrochloride (approved by FDA and sold in the United States under the brand name Welchol®) is a modified cross-linked polyallylamine polymer containing polyallylamine base moiety having a $CH_2$-CHOH—$CH_2$ group between two amino groups, N-alkylated with a specific ratio of (6-trimethylammonium)hexyl group and decyl group. Colesevelam hydrochloride has almost all of its amines protonated and contains about 21% chloride by weight. Colesevelam hydrochloride is a high capacity bile acid binding polymer and is administered orally to treat hyperlipidemia. The process of making colesevelam is disclosed in U.S. Pat. No. 5,607,669 (Mandeville III, et al.), U.S. Pat. No. 5,679,717 (Mandeville III et al.), U.S. Pat. No. 5,693,675 (Mandeville III et al.), U.S. Pat. No. 5,917,007 (Mandeville III et al.), U.S. Pat. No. 5,919,832 (Mandeville III et al.), U.S. Pat. No. 6,066,678 (Mandeville III et al.), U.S. Pat. No. 7,101,960 (Mandeville III et al.), U.S. Pat. No. 6,433,026 (Mandeville III et al.) and U.S. Pat. No. 6,874,254 (Silvera et al.) which are herein incorporated by reference. These processes are also good for making a hydrochloride salt of the cross-linked polymer in the chloride form. In contrast, sevelamer carbonate is a salt of the cross-linked polymer in the carbonate form. Sevelamer carbonate (approved by FDA sold in the United States under the brand name Renvela®), which is yet another cross-linked polyallylamine polymer, having a $CH_2$-CHOH—$CH_2$ group between two amino groups containing bicarbonate anions, and is prescribed to treat hyperphosphatamia. According to the packaging insert of Renvela®, "Sevelamer Carbonate is an anion exchange resin with the same polymeric structure as sevelamer hydrochloride in which carbonate replaces chloride as the counterion. While the counterions differ for the two salts, the polymer structure itself the active moiety, is the same". The advantage of administering sevelamer carbonate over sevelamer hydrochloride is that in the administration of sevelamer carbonate, the excess load of chloride ions is averted and helps to maintain bicarbonate level in the blood. According to the label and a review of literature for sevelamer carbonate, sevelamer carbonate is made by an ion exchange process using sevelamer hydrochloride, by displacing the chloride ions with carbonate ions. Though the Renvela® package insert states that the active moiety in sevelamer carbonate is same as that of sevelamer hydrochloride none of the listed examples disclosed in U.S. Pat. No. 5,496,545 (Holmes-Farley et al.), U.S. Pat. No. 5,667,775 (Holmes-Farley et al.), U.S. Pat. No. 6,509,013 (Holmes-Farley et al.), U.S. Pat. No. 6,858,203 (Holmes-Farley et al.), or U.S. Pat. No. 7,014,846 (Holmes-Farley et al.), describe the process of making sevelamer carbonate. None of the examples described in these patents, however, disclose the conversion of sevelamer hydrochloride to sevelamer carbonate.

The abstract of Indian Patent Application No. 1893/MUM/2006 (Milind et al.), discloses a process of making sevelamer carbonate by treating a suspension of sevelamer base with carbon dioxide. However, this reference does not disclose the conversion of sevelamer hydrochloride to sevelamer carbonate. The advantage of administering sevelamer carbonate over sevelamer hydrochloride is that the excess load of chloride ions is averted and helps to maintain bicarbonate level in the blood.

The present invention discloses a novel process of manufacturing sevelamer carbonate from a polyallylamine carbonate and/or bicarbonate chloride salt mixture directly without first making sevelamer hydrochloride and further converting to sevelamer carbonate. This novel process involves making the carbonate and/or bicarbonate salt of polyallylamine and then performing cross-linking with epichlorohydrin. This introduces carbonate and/or bicarbonate ions into the polyallylamine and helps to arrange the polyallylamine chain in the solution in such a way that the cross-linking reaction with epichlorohydrin can be controlled at a desired reaction rate. The process involves simple and fewer operations that are suitable for commonly available manufacturing equipment and working capacities. The invention further discloses a novel process of making colesevelam carbonate and/or bicarbonate salt mixture, and a process of making colestipol bicarbonate and/or bicarbonate salt.

SUMMARY OF THE INVENTION

The present invention provides a novel process of making carbonate and/or bicarbonate salt of cross-linked polyallylamine polymers. Specifically, sevelamer carbonate is made by reacting Polyallylamine hydrochloride with carbonate and/or bicarbonate ions followed by cross-linking with epichlorohydrin in the presence of sodium hydroxide. Also disclosed a novel process of making colesevelam carbonate by reacting Polyallylamine hydrochloride with carbonate and/or bicarbonate ions followed by cross-linking with epichlorohydrin and N-alkylation with 6-(trimethylammonium)hexyl bromide and n-decylbromide in the presence of sodium hydroxide. This novel process of introducing carbonate and/or bicarbonate ions into the polyallylamine helps to arrange the polyallylamine chain in the solution in such a way that the cross linking reaction with epichlorohydrin can be controlled at a desired reaction rate. Also disclosed is a process of making colestipol carbonate by copolymerisation of diethylene triamine carbonate/bicarbonate salt with epichlorohydrin in the presence of sodium hydroxide.

These other objects of the present invention are provided by a process of making cross-linked Polyallylamine carbonate salt comprising: (a) reacting homopolymer of polyallylamine hydrochloride with carbonate and/or bicarbonate ions to form polyallylamine chloride, carbonate and/or bicarbonate salt; (b) cross-linking the polyallylamine chloride, carbonate and/or bicarbonate salt obtained in step (a) with a cross-linking agent, in the presence of sodium hydroxide to form a wet gel; (c) reducing the particle size of the wet gel obtained in step (b); (d) purifying the wet gel particles obtained in the step (c) with water to significantly remove the ionic impurities; and (e) drying the purified gel particles obtained in step (d).

In this process, the wet gel obtained may be sevelamer carbonate. Additionally, the purified gel obtained in step (e) may predominantly have the carbonate as $(CO_3)^{2-}$.

In certain embodiments the purified gel may have a chloride ion level below about 0.2% by weight, or below about 0.1% by weight, or even below about 0.05% by weight.

Additionally, the process may have the drying step, step (e) be performed between 80 to 120° C. This step may also be performed under a vacuum of about 500 to 760 mm Hg. This step may also be performed at 80 to 120° C. using the flow of hot air.

The present invention also discloses a process of making alkylated cross-linked Polyallylamine carbonate salt comprising: (a) reacting homopolymer of polyallylamine hydrochloride with carbonate and/or bicarbonate ions to form polyallylamine chloride, carbonate and/or bicarbonate salt; (b) cross-linking and reacting the polyallylamine chloride, carbonate and/or bicarbonate salt obtained in step (a) with a cross-linking agent and alkylating agents in the presence of sodium hydroxide to form a wet gel; (c) reducing the particle size of the wet gel obtained in step (b); (d) purifying the wet gel particles obtained in step (c) with water to significantly remove the chloride and/or bromide ions; and (e) drying the purified gel particles obtained in step (d).

The purified gel obtained in step (d) may be colsevelam carbonate. Additionally, the alkylating agent may be 6-chlorohexyl trimethyl ammonium chloride, n-decylchloride, 6-bromohexyl trimethyl ammonium bromide, n-decyl bromide or a combination of these agents. The purified get in step (e) may also be colesevelam carbonate.

In both processes, step (d) of purifying may involve treating the gel particles with either water or an aqueous solvent mixture. The aqueous solvent mixture may have water, a base and at least one water miscible solvent. In other embodiments, the aqueous solvent mixture may comprise water and at least one base.

The base may be a mixture of one or more bases selected from the group of alkali metal hydroxide, alkali metal carbonates and/or alkali metal bicarbonates. The base may be sodium hydroxide, sodium bicarbonate, sodium carbonate, ammonium carbonate, or ammonium bicarbonate.

The invention further discloses a process of making colestipol carbonate and/or bicarbonate salt comprising: (a) reacting diethylene triamine hydrochloride with carbonate and/or bicarbonate ions to form diethylene triamine chloride, carbonate and/or bicarbonate salt; (b) reacting and copolymerizing the diethylene triamine chloride, carbonate and/or bicarbonate salt obtained in step (a) with a copolymerizing agent, in the presence of sodium hydroxide to form a wet gel; (c) reducing the particle size of the wet gel obtained in step (b); (d) purifying the wet gel particles obtained in step (c) with water to significantly remove the chloride ions; and (e) drying the purified gel particles obtained in step (d).

The purified gel obtained in step (d) may be colestipol carbonate or colestipol bicarbonate.

The cross-linking agent may be epichlorohydrin. The copolymerizing agent may also be epichlorohydrin.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Sevelamer hydrochloride and sevelamer carbonate are administered in high doses of about 400 mg to 2000 mg/day, requiring production of large batches to obtain the required annual amount of sevelamer hydrochloride and sevelamer carbonate of about 150 metric tons/year. Current processes of making these compounds such as disclosed by U.S. Pat. No. 6,180,754 (the polyallylamine hydrochloride was dialysed to remove a certain specified amount of the hydrochloride and further cross-linked with epichlorohydrin to form Sevelamer hydrochloride) are very difficult to operate at a large scale as these cross-linked polyallylamine polymers are water swellable, and upon isolation from water these polymers swell and occupy a large volume of about at least 5 times the volume of the dry material.

Specifically the process of making sevelamer hydrochloride by cross-linking polyallylamine hydrochloride with epichlorohydrin in the presence of sodium hydroxide yields the hydrochloride salt. Sevelamer hydrochloride is a good anion exchange polymer and the carbonate salt of sevelamer can be obtained by treating sevelamer hydrochloride with carbonate and/or bicarbonate anions in an aqueous solvent medium. Such process adds the additional difficult step of making the carbonate salt by anion exchange from the corresponding chloride salt. The key issue of the manufacturing process of handling cross-linked polyallylamine is that the polymer is water swellable and swells to at least 5 times the volume of the dried material. This makes the manufacturing process that involves treating cross-linked Polyallylamine with water a difficult task, because the handling of the large volumes and the requirement of unusually large capacities of manufacturing equipments. Thus, each step of treatment with water makes the process more complicated. Therefore, the process of making sevelamer hydrochloride, treating with water to remove all the sodium chloride, treating with sodium carbonate and/or bicarbonate in an aqueous medium to convert the sevelamer hydrochloride into sevelamer carbonate, isolation of sevelamer carbonate, and washing with water to remove all water soluble impurities and salts, makes the operation cumbersome in handling the very large capacities of wet gel.

The invention discloses a process of making sevelamer carbonate, by reacting polyallylamine hydrochloride with a specified quantity of carbonate and/or bicarbonate salt in a solvent medium and further cross-linking the salt mixture using epichlorohydrin in presence of a base such as sodium hydroxide. The wet gel of sevelamer carbonate prepared by this process is obtained in a single step operation and all the operations are compatible with normally available manufacturing equipment for the production of the active pharmaceutical ingredient (API).

The cross-linking reaction of the carbonate and/or bicarbonate salt of polyallylamine using epichlorohydrin in presence of sodium hydroxide is found to proceed at a very slow rate and it typically takes more than 30 hours to form the polymer gel. However, it is found, according to this invention, that at a specific ratio of carbonate and/or bicarbonate anion to the polyallylamine hydrochloride, the cross-linking reaction proceeds within about 2 hours and yields a thick glassy polymer gel which upon curing forms a glassy granular gel. The particle size of such wet polymer granular gel may be reduced by passing the wet granular gel through sieves or through a multi-mill to obtain a desired particle size. The wet gel particles may be treated with water to remove the sodium chloride formed during the cross-linking reaction and may be further dried to obtain a powder suitable for making oral dosage forms.

According to an embodiment, polyallylamine hydrochloride may be reacted with sodium bicarbonate and/or sodium carbonate at a ratio of amine group to carbonate ion at about 1:0.2 to 1:0.6 followed by cross-linking with epichlorohydrin in the presence of sodium hydroxide and stirred at room temperature for about 2 hours. Ammonium bicarbonate also may be used in place of sodium bicarbonate. The thick glassy gel was stirred and broken into lumps and milled through a multi-mill. The milled particles of glassy gel may be mixed with water and washed thoroughly to remove all the sodium chloride. Additional washing with aqueous solution of a base may be given. The base may be sodium bicarbonate, sodium carbonate, sodium hydroxide or mixtures of each base. The washed wet gel may be dried at about 35° C. to 70° C. The product obtained by this process is characterized as sevelamer carbonate and shows good binding capacity for phosphate.

According to another embodiment, an aqueous solution of diethylene triamine hydrochloride may be treated with sodium bicarbonate and/or sodium carbonate at a ratio of amine group to carbonate ion at about 5:1 followed by copolymerizing with epichlorohydrin in the presence of sodium hydroxide and stirred at room temperature for about 6 hours. Ammonium bicarbonate also may be used in place of sodium bicarbonate. The thick glassy gel may be stirred and broken into lumps and milled through a multi-mill. The milled particles of glassy gel may be mixed with water and washed thoroughly to remove all the sodium chloride, and dried at about 35° C. to 70° C. The product obtained by this process is characterized as colestipol carbonate.

According to another embodiment, polyallylamine hydrochloride may be reacted with mixture of sodium bicarbonate at a ratio of amine group to carbonate ion at about 1:0.1 to 1:0.6 followed by cross-linking with epichlorohydrin and N-alkylation with 6-halohexyl trimethylammonium halide and decyl halide in presence of sodium hydroxide and stirred at room temperature for about 2 hours. The halo substitution or the halide anion of the alkylating agents may be chloride or bromide, preferably chloride. The thick glassy gel may be stirred and broken into lumps and milled through a multi-mill. The milled particles of glassy gel may be mixed with water and washed thoroughly to remove all the sodium chloride, and dried at about 35° C. to 70° C. The product obtained by this process is characterized as colesevelam carbonate and/or bicarbonate salt. The currently marketed colesevelam hydrochloride has about 21% chloride by weight and increased more load of chloride ion in the bowl. Colesevelam carbonate and/or bicarbonate salt obtained by the process of this invention helps to lower the chloride overload in the bowl.

Additionally, this invention also discloses that the carbonate ion present in cross-linked polyallylamine carbonate and/or bicarbonate salt is found to exist predominantly as divalent carbonate ion bound with two protonated amino groups. An aqueous suspension of sevelamer carbonate (epichlorohydrin cross-linked polyallylamine carbonate and/or bicarbonate salt) exerts a pH of about 9. The pKa of the proton in bicarbonate ion is about 9.8 and the pKa of primary aliphatic amine is 10.6, therefore at a pH of about 9 the equilibrium between bicarbonate and carbonate ion is more shifted towards the carbonate ion side. Also experimentally it is confirmed that the carbonate ion present in sevelamer carbonate does not react with sodium hydroxide, whereas it consumes two equivalent of hydrochloric acid for one equivalent of carbonate ion in sevelamer carbonate, liberating the weaker carbonic acid which decomposes further into water and carbon dioxide. This proves that the carbonate ion is the predominant salt of sevelamer carbonate.

Embodiments of this invention are supported by the following examples, and modifications of reagent quantities and process operation parameters are within the scope of this invention.

Polyallylamine hydrochloride is the raw material used herein in the examples, which is prepared by the process known in the art, such as by dissolving allylamine gas into hydrochloric acid and polymerizing using a radical initiator, 2,2'-azobis(2-methylpropionaimidine) dihydrochloride. The polyallylamine hydrochloride obtained by this process was isolated by filtration and washed with one or more water miscible solvents. The isolated polyallylamine hydrochloride was dried and tested for chloride content by argentometric titration. Polyallylamine hydrochloride salt is typically found to contain about 30 to 40% of chloride by weight. The molecular weight of polyallylamine hydrochloride, determined by HPLC using a gel permeation column, is about 2000 to 25000 daltons.

EXAMPLE-1

Process of Making Cross-linked Polyallylamine Chloride, Carbonate and/or Bicarbonate Salts, Using Epichlorohydrin as Cross Linking Agent Into a glass flask containing a solution of 36 g of sodium bicarbonate in about 200 mL water at about 20 to 35° C. about 100 g of polyallylamine hydrochloride was added slowly. Using a mechanical stirrer, the mixture was stirred to form a clear solution. To the clear solution a solution of about 28 g of sodium hydroxide in 50 mL water was added and stirred for about 30 minutes. Under stirring at a temperature of about 20 to 35° C., about 11 g of epichlorohydrin was added to the reaction mixture and stirred well for about 1 hour to form a glassy gel. The glassy gel was allowed to cure for about 24 hrs undisturbed. The glassy gel was broken up using a glass rod/mechanical stirrer to obtain glassy gel lumpy granules. The gel granules were unloaded and passed through the sieve to obtain wet gel particles.

EXAMPLE-2

Process of Purification of the Wet Gel Particles Obtained in Example-1 Using Water The wet gel particle obtained in Example-1 in the beaker was transferred and stirred with about 1000 mL water for about 8 hrs. The wet gel was filtered over Buckner filter flask. The washing was repeated with water to remove all the sodium chloride in the gel. The purified wet gel particles were isolated by filtration and dried over a tray dryer at a temperature of about 25 to 70° C. under a vacuum at about 600 to 755 mm Hg. The weight of the dried material was 83 g containing about 2% water. The chloride content is 0.2%

EXAMPLE-3

Process of Purification of the Wet Gel Particles Obtained in Example-1 Using Aqueous Base Solution (a) The wet gel particles obtained in Example-1 in the beaker were transferred and stirred with about 1000 mL water for about 8 hrs. The wet gel was filtered over Buckner filter flask and washed with about 500 mL of methanol. The washing was repeated with aqueous sodium bicarbonate solution to remove all the sodium chloride in the gel, and was followed by washing with water. The purified wet gel particles were isolated by filtration and dried over a tray dryer at temperature of about 25 to 70° C. under a vacuum at about 600 to 755 mm Hg. The weight of the dried material is 82 g. The chloride content is less than 0.1%.

(b) The wet gel particles obtained in Example-1 in the beaker were transferred and stirred with about 1000 mL water for about 8 hrs. The wet gel was filtered over Buckner filter flask and washed with about 500 mL of methanol. The washing was repeated with aqueous sodium hydroxide solution to remove all the sodium chloride in the gel, followed by washing with water and washing with methanol. The purified wet gel particles were isolated by filtration and dried over a tray dryer at a temperature of about 25 to 70° C. under a vacuum at about 600 to 755 mm Hg. The weight of the dried material was 83 g and the chloride content is less than 0.2%.

EXAMPLE-4

Process of Making Cross-linked Polyallylamine Chloride, Carbonate and/or Bicarbonate Salt, Using Epichlorohydrin as Cross-linking Agent Into a glass flask containing a solution of 40 g of sodium bicarbonate in about 200 mL water at about 20 to 35° C. was slowly added about 100 g of polyallylamine hydrochloride. Using a mechanical stirrer, the mixture was stirred to form a clear solution. To the clear solution was added a solution of about 28 g of sodium hydroxide in 50 mL water and was stirred for about 30 minutes. Under stirring at a temperature of about 20 to 35° C., about 11 g of epichlorohydrin was added to the reaction mixture and stirred well for about 30 hours to form a glassy gel. The glassy gel was allowed to cure for about 24 hrs undisturbed. The glassy gel was broken using a glass rod/mechanical stirrer to obtain glassy gel lumpy granules. The gel granules were unloaded and passed through the sieve to obtain wet gel particles. The wet gel particles were transferred into the beaker and stirred with about 1000 mL water for about 8 hrs. The wet gel was filtered over Buckner filter flask. The washing was repeated with aqueous sodium bicarbonate solution to remove all the sodium chloride in the gel, followed by washing with water. The purified wet gel particles were isolated by filtration and dried over a tray dryer at a temperature of about 25 to 70° C. under a vacuum at about 600 to 755 mm Hg. The weight of the dried material was 80 g containing about 2% water.

EXAMPLE-5

Process of Making Polyallylamine Carbonate and/or Bicarbonate Salt

Into a glass flask containing a solution of 95 g of sodium bicarbonate in about 200 mL water at about 20 to 35° C., was slowly added about 100 g of polyallylamine hydrochloride. Using a mechanical stirrer, the mixture was stirred to form a clear solution. The solution was concentrated by removing water by distillation followed by the addition of methanol to precipitate polyallylamine carbonate and/or bicarbonate salt. The precipitate was isolated by filtration, was further washed with methanol and was dried under a vacuum of about 700 mm Hg at about 45° C.

EXAMPLE-6

Process of Making Cross-linked Polyallylamine Chloride, Carbonate and/or Bicarbonate Salt, Using Epichlorohydrin as Cross-linking Agent: 2 Kg Batch Size Into a glass reactor fitted with glass shaft and Teflon stirrer, containing a solution of 870 g of sodium bicarbonate in about 4.8 L water at about 20 to 35° C. was slowly added about 2.4 Kg of polyallylamine hydrochloride. Using a mechanical stirrer, the mixture was stirred to form a clear solution. To the clear solution was added a solution of about 685 g of sodium hydroxide in 1.2 L water and was stirred for about 30 minutes. Under stirring at a temperature of about 20 to 35° C., about 268 g of epichlorohydrin was added to the reaction mixture and stirred well for about 1 hour to form a glassy gel. The glassy gel was allowed to cure for about 24 hrs undisturbed. About 30 L water was added and the glassy gel was broken by stirring to obtain glassy gel lumpy granules. The glassy wet gel was isolated using a centrifuge, and the gel granules were unloaded and passed through the sieve to obtain wet gel particles.

The wet gel particle was transferred into a clean reactor and stirred with an aqueous solution containing about 480 g of sodium bicarbonate in 25 L water for about 8 hrs. The wet gel was filtered using a centrifuge, and was washed with about 6 L of water followed by 3 L of methanol. The wet gel was unloaded and the washing was repeated by making a slurry with methanol. This was stirred for about 8 hours. The purified wet gel particles were isolated by filtration and dried over a tray dryer at a temperature of about 25 to 70° C. under a vacuum at about 600 to 755 mm Hg. The weight of the dried material was 2 Kg. The chloride content was less than 0.05%, and the water content was 4%.

EXAMPLE-7

Process of Making N-alkylated Cross-linked Polyallylamine Chloride, Carbonate and/or Bicarbonate Salt, Using Epichlorohydrin as Cross-linking Agent and N-decylchloride and 6-chlorohexyl Trimethylammonium Chloride as Alkylating Agents Into a glass flask containing a solution of 18 g of sodium bicarbonate in about 200 mL water at about 20 to 35° C. was slowly added about 100 g of polyallylamine hydrochloride. Using a mechanical stirrer, the mixture was stirred to form a clear solution. To the clear solution was added a solution of about 36 g of sodium hydroxide in 50 mL water and was stirred for about 30 minutes. Under stirring at a temperature of about 20 to 35° C., about 6 g of epichlorohydrin, 76 g of n-decylchloride and 78 g of 6-chlorohexyl trimethylammonium chloride were added to the reaction mixture and was stirred well for about 6 hours to form a glassy gel. The glassy gel was allowed to cure for about 24 hrs undisturbed. The glassy gel was broken using a glass rod/mechanical stirrer to obtain glassy gel lumpy granules. The gel granules were unloaded and passed through the sieve to obtain wet gel particles. The wet gel particles in the beaker were transferred and stirred with about 1000 mL water for about 8 hrs. The wet gel was filtered over Buckner filter flask. The washing with aqueous sodium bicarbonate solution was repeated to remove all the sodium chloride in the gel, and was followed by washing with water and washing with methanol. The purified wet gel particles were isolated by filtration and dried over a tray dryer at a temperature of about 25 to 70° C. under a vacuum at about 600 to 755 mm Hg. The weight of the dried material was 190 g.

EXAMPLE-8

Process of Making Copolymer of Diethylene Triamine-epichlorohydrin Chloride, Carbonate and/or Bicarbonate Salt Into a glass flask containing a solution of 30 g of sodium bicarbonate in about 200 mL water at about 20 to 35° C. was slowly added about 100 g of diethylene triamine hydrochloride. Using a mechanical stirrer, the mixture was stirred and added a solution of about 25 g of sodium hydroxide in 50 mL water and was stirred for about 30 minutes. Under stirring at a temperature of about 20 to 35° C., about 90 g of epichlorohydrin was added to the reaction mixture and stirred well for about 10 hours to form a glassy gel. The glassy gel was allowed to cure for about 24 hrs undisturbed. The glassy gel was broken using a glass rod/mechanical stirrer to obtain glassy gel lumpy granules. The gel granules were unloaded and passed through the sieve to get wet gel particles. The wet gel particles were transferred into the beaker and stirred with about 1000 mL water for about 8 hrs. The wet gel was filtered over Buckner filter flask. The washing with aqueous sodium bicarbonate solution was repeated to remove all the sodium chloride in the gel, and was followed by washing with water and with methanol. The purified wet gel particles were isolated by filtration and dried over a tray dryer at a temperature of about 25 to 70° C. under a vacuum at about 600 to 755 mm Hg. The weight of dried material was 150 g containing about 0.5% water.

EXAMPLE-9

Process of Making Cross-linked Polyallylamine Chloride, Carbonate and/or Bicarbonate Salt, Using Epichlorohydrin as Cross Linking Agent Into a glass flask containing a solution of 36 g of sodium bicarbonate in about 150 mL water and 50 mL methanol at about 20 to 35° C., was slowly added about 100 g of polyallylamine hydrochloride. Using a mechanical stirrer, the mixture was stirred to form a clear solution. To the clear solution was added a solution of about 28 g of sodium hydroxide in 50 mL water and was stirred for about 30 minutes. Under stirring at a temperature of about 20 to 35° C., about 11 g of epichlorohydrin was added to the reaction mixture and stirred well for about 1 hour to form a glassy gel. The glassy gel was allowed to cure for about 24 hrs undisturbed. The glassy gel was broken using a glass rod/mechanical stirrer to obtain glassy gel lumpy granules. The gel granules were unloaded and passed through the sieve to obtain wet gel particles. The wet gel particles obtained were transferred into the beaker and stirred with about 1000 mL water for about 8 hrs. The wet gel was filtered over Buckner filter flask and was washed with about 500 mL of methanol. The washing was repeated with aqueous sodium bicarbonate solution to remove all the sodium chloride in the gel, and was followed by washing with water. The purified wet gel particles were isolated by filtration and dried over a tray dryer at a temperature of about 25 to 70° C. under a vacuum at about 600 to 755 mm Hg. The weight of the dried material was 80 g. The chloride content was less than 0.1%

EXAMPLE-10

Process of Making N-alkylated Cross-linked Polyallylamine Chloride, Carbonate and/or Bicarbonate Salt, Using Epichlorohydrin as Cross-linking Agent and N-decylchloride and 6-chlorohexyl Trimethylammonium Chloride as Alkylating Agents Into a glass flask containing a solution of 18 g of sodium bicarbonate in about 150 mL water and 50 mL methanol at about 20 to 35° C., was slowly added about 100 g of polyallylamine hydrochloride. Using a mechanical stirrer, the mixture was stirred to form a clear solution. To the clear solution was added a solution of about 36 g of sodium hydroxide in 50 mL water and was stirred for about 30 minutes. Under stirring at a temperature of about 30 to 45° C., about 6 g of epichlorohydrin, a mixture of 76 g of n-decylchloride, 78 g of 6-chlorohexyl trimethylammonium chloride and 100 mL methanol was added to the reaction mixture and stirred well for about 6 hours to form a glassy gel. The glassy gel was allowed to cure for about 24 hrs undisturbed. The glassy gel was broken using a glass rod/mechanical stirrer to obtain glassy gel lumpy granules. The gel granules and were unloaded and passed through the sieve to get wet gel particles. The wet gel particle in the beaker were transferred and stirred with about 1000 mL water for about 8 hrs. The wet gel was filtered over Buckner filter flask. The washing was repeated with aqueous sodium bicarbonate solution to remove all the sodium chloride in the gel, and was followed by washing with water and washing with methanol. The purified wet gel particles were isolated by filtration and dried over a tray dryer at a temperature of about 25 to 70° C. under a vacuum at about 600 to 755 mm Hg. The weight of the dried material was 190 g.

EXAMPLE-11

Process of Making Copolymer of Diethylene Triamine-epichlorohydrin Chloride, Carbonate and/or Bicarbonate Salt Into a glass flask containing a solution of 30 g of sodium bicarbonate in about 150 mL water and 50 mL methanol at about 20 to 35° C., was slowly added about 100 g of diethylene triamine hydrochloride. Using a mechanical stirrer, the mixture was stirred and was added a solution of about 25 g of sodium hydroxide in 50 mL water and was stirred for about 30 minutes. Under stirring at a temperature of about 35 to 60° C., about 90 g of epichlorohydrin was added to the reaction mixture and was stirred well for about 8 hours to form a glassy gel. The glassy gel was allowed to cure for about 24 hrs undisturbed. The glassy gel was broken using a glass rod/mechanical stirrer to obtain glassy gel lumpy granules. The gel granules were unloaded and passed through the sieve to obtain wet gel particles. The wet gel particles were transferred into the beaker and stirred with about 1000 mL water for about 8 hrs. The wet gel was filtered over Buckner filter flask. The washing with aqueous sodium bicarbonate solution was repeated to remove all the sodium chloride in the gel, and was followed by washing with water, and by washing with methanol. The purified wet gel particles were isolated by filtration and dried over a tray dryer at a temperature of about 25 to 70° C. under a vacuum at about 600 to 755 mm Hg. The weight of the dried material was 145 g.

EXAMPLE-12

Process of Making Cross-linked Polyallylamine Chloride, Carbonate and/or Bicarbonate Salt, Using Epichlorohydrin as Cross Linking Agent Into a glass flask containing a solution of 18 g of sodium bicarbonate in about 150 mL water at about 0 to 35° C. was slowly added about 50 g of polyallylamine hydrochloride. Using a mechanical stirrer, the mixture was stirred to form a clear solution at 0 to 35° C. To the clear solution was added a solution of about 14.8 g of sodium hydroxide in 40 mL water and was stirred at 0 to 35° C. Under stirring at a temperature of about 0 to 35° C., about 4.54 g of epichlorohydrin was added to the reaction mixture and was stirred well to form a glassy gel. The glassy gel was allowed to cure for about 24 hrs undisturbed. The glassy gel was broken using a glass rod/mechanical stirrer to obtain glassy gel lumpy granules. 750 mL of water was added to the gel and stirred for 8 hrs. The gel granules were filtered and passed through the sieve to get wet gel particles.

EXAMPLE-13

Process of Purification of the Wet Gel Particles Obtained in Example-1 Using Water The wet gel particles obtained in Example-12 were transferred in the beaker and stirred with about 750 mL water and about 10 g sodium bicarbonate for about 24 hrs. The wet gel was filtered over Buckner filter flask. The washing with water was repeated to remove all the sodium chloride in the gel. The purified wet gel particles were isolated by filtration and air dried at 80 to 120° C. The weight of the dried material was 34 g and contained less than 1% water. The chloride content was less than 0.2%

EXAMPLE-14

Process of Purification of the Wet Gel Particles Obtained in Example-1 Using Water The wet gel particles obtained in Example-12 in the beaker was transferred and stirred with about 750 mL water and about 10 g sodium bicarbonate for about 24 hrs. The wet gel was filtered over Buckner filter flask. The washing with water was repeated to remove all the sodium chloride in the gel. The purified wet gel particles were isolated by filtration and were dried over a tray dryer at a temperature of about 80 to 120° C. under a vacuum of about 500 to 755 mm Hg. The weight of dried material was 35 g and contained about 4% water. The chloride content was less than 0.2%.

EXAMPLE-15

Process of Making N-alkylated Cross-linked Polyallylamine Chloride Carbonate and/or Bicarbonate Salt, Using Epichlorohydrin as Cross-linking Agent and N-decylbromide and 6-bromohexyl Trimethylammonium Bromide as Alkylating Agents Into a glass flask containing a solution of 18 g of sodium bicarbonate in about 150 mL water at about 0 to 35° C. was slowly added about 50 g of polyallylamine hydrochloride. Using a mechanical stirrer, the mixture was stirred to form a clear solution at 0 to 35° C. To the clear solution was added a solution of about 14.8 g of sodium hydroxide in 40 mL water and was stirred at 0 to 35° C. Under stirring at a temperature of about 0 to 35° C., about 3.2 g of epichlorohydrin was added to the reaction mixture and stirred well to form a glassy gel. The glassy gel was allowed to cure for about 24 hrs undisturbed. The glassy gel was broken using a glass rod/mechanical stirrer to obtain glassy gel lumpy granules. 750 mL of water was added to the gel and stirred for 8 hours. The gel granules were filtered and passed through the sieve to obtain wet gel particles.

The wet gel particle obtained was transferred into a beaker and stirred with about 750 mL water and about 10 g sodium bicarbonate for about 24 hrs. The wet gel was filtered over Buckner filter flask. The washing with water was repeated to remove all the sodium chloride in the gel. The purified wet gel particles were isolated by filtration and air dried at 80 to 120° C. The weight of dried material was 30 g.

The dried material obtained above was transferred to a beaker and 600 mL of methanol and 13 g sodium hydroxide were added and stirred for 2 hrs. To the suspension 44 g of 6-bromohexyl trimethylammonium bromide and 37 g of n-decylbromide (1-bromodecane) were added and heated to reflux for 24 hours. The suspension was cooled and isolated the gel by filtration. The wet gel particles were transferred into a beaker containing 20 g sodium bicarbonate and 1000 mL water, and stirred for about 8 hours. The wet gel was filtered over Buckner filter flask. The washing with aqueous sodium bicarbonate solution followed by water wash was repeated to remove all the sodium chloride and sodium bromide in the gel. The purified wet gel particles were isolated by filtration and air dried at about 40 to 120° C. The weight of the dried material was 75 g.

While the invention has been specifically described in connection with certain specific embodiments thereof, it is to be understood that this is by way of illustration and not of limitation and that various changes and modifications in form and details can be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A process of making cross-linked polyallylamine carbonate salt comprising:
    (a) reacting homopolymer of polyallylamine hydrochloride with carbonate and/or bicarbonate ions to form polyallylamine carbonate and/or bicarbonate salt, wherein the ratio of amine group of the polyallylamine hydrochloride to the carbonate and/or bicarbonate ions is about 1:0.2 to about 1:0.6;
    (b) cross-linking the polyallylamine carbonate and/or bicarbonate salt obtained in step (a) with a cross-linking agent, in the presence of sodium hydroxide to form a wet gel;
    (c) reducing the particle size of the wet gel obtained in step (b);
    (d) purifying the wet gel particles obtained in the step (c) with water or an aqueous solvent mixture to significantly remove the ionic impurities; and
    (e) drying the purified gel particles obtained in step (d).

2. The process of claim 1, wherein the wet gel obtained is sevelamer carbonate.

3. The process of claim 1, wherein the purified gel obtained in step (e) predominantly has the carbonate as $(CO_3)^{2-}$.

4. The process of claim 1, wherein the purified gel has a chloride ion level below about 0.2% by weight.

5. The process of claim 1, wherein the purified gel has a chloride ion level below about 0.1% by weight.

6. The process of claim 1, wherein the purified gel has a chloride ion level below about 0.05% by weight.

7. The process of claim 1, wherein step (d) of purifying involves treating the gel particles with an aqueous solvent mixture.

8. The process of claim 7, wherein the aqueous solvent mixture contains water, a base and at least one water miscible solvent.

9. The process of claim 7, wherein the aqueous solvent mixture comprises water and at least one base.

10. The process of claim 9, wherein the base is a mixture of one or more bases selected from the group of alkali metal hydroxide, alkali metal carbonates and/or alkali metal bicarbonates.

11. The process of claim 9, wherein the base is sodium hydroxide.

12. The process of claim 9, wherein the base is sodium bicarbonate.

13. The process of claim 9, wherein the base is sodium carbonate.

14. The process of claim 9, wherein the base is ammonium carbonate.

15. The process of claim 9, wherein the base is ammonium bicarbonate.

16. The process of claim 1, wherein the cross-linking agent is epichlorohydrin.

17. The process of claim 1, wherein during step (e) the drying is performed at 80 to 120° C.

18. The process of claim 1, wherein during step (e) the drying is performed at 80 to 120° C. under vacuum of about 500 to 755 mm Hg.

19. The process of claim 1, wherein during step (e) the drying is performed at 80 to 120° C. using the flow of hot air.

20. The process of claim 1, wherein step (b) completes within about 2 hours at room temperature.

21. A process of making alkylated cross-linked polyallylamine carbonate salt comprising:
    (a) reacting homopolymer of polyallylamine hydrochloride with carbonate and/or bicarbonate ions to form polyallylamine carbonate and/or bicarbonate salt; wherein the ratio of amine group of the polyallylamine hydrochloride to the carbonate and/or bicarbonate ions is about 1:0.1 to about 1:0.6;
    (b) simultaneously cross-linking and reacting the polyallylamine carbonate and/or bicarbonate salt obtained in step (a) with a cross-linking agent and alkylating agents in the presence of sodium hydroxide to form a wet gel in a single step operation;
    (c) reducing the particle size of the wet gel obtained in step (b);
    (d) purifying the wet gel particles obtained in step (c) with water or an aqueous solvent mixture to significantly remove the chloride and/or bromide ions; and
    (e) drying the purified gel particles obtained in step (d).

22. The process of claim 21, wherein the purified gel obtained in step (d) is colsevelam carbonate.

23. The process of claim 21, wherein the alkylating agent is 6-chlorohexyl trimethyl ammonium chloride.

24. The process of claim 21, wherein the alkylating agent is n-decylchloride.

25. The process of claim 21, wherein the alkylating agent is mixture of 6-chlorohexyl trimethyl ammonium chloride and n-decylchloride.

26. The process of claim 21, wherein the alkylating agent is 6-chlorohexyl trimethyl ammonium chloride and/or 6-bromohexyl trimethyl ammonium bromide.

27. The process of claim 21, wherein the alkylating agent is n-decylchloride and/or n-decyl bromide.

28. The process of claim 21, wherein the alkylating agent is mixture of 6-bromohexyl trimethyl ammonium bromide and n-decylbromide.

29. The process of claim 21, wherein the purified gel in step (e) is colesevelam carbonate.

30. The process of claim 21, wherein step (d) of purifying involves treating the gel particles with an aqueous solvent mixture.

31. The process of claim 21, wherein the cross-linking agent is epichlorohydrin.

32. The process of claim 21, wherein step (b) proceeds at a temperature of about 20° C. to about 35° C.

33. The process of claim 21, wherein step (b) completes within about 2 hours at room temperature.

34. The process of claim 21, wherein step (b) proceeds in the absence of an organic solvent.

* * * * *